Oct. 27, 1942.  H. T. PLATZ  2,300,173
APPARATUS FOR DRESSING WELDER ELECTRODES
Filed Dec. 2, 1940  2 Sheets-Sheet 1
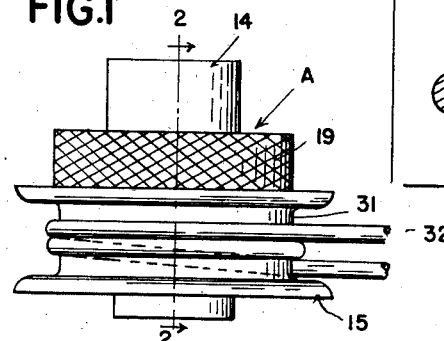
FIG.1
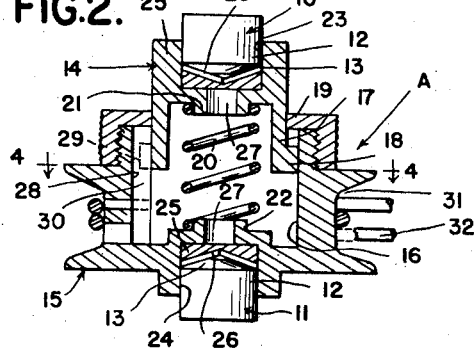
FIG.2.
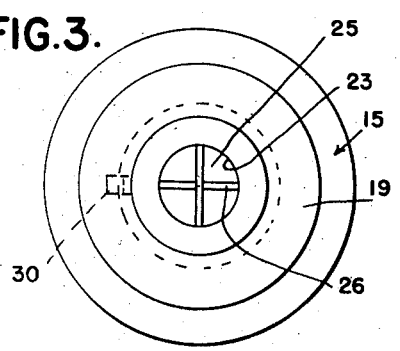
FIG.3.
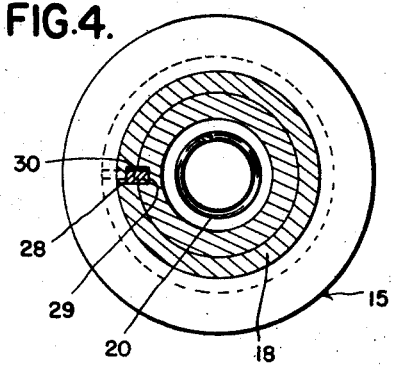
FIG.4.
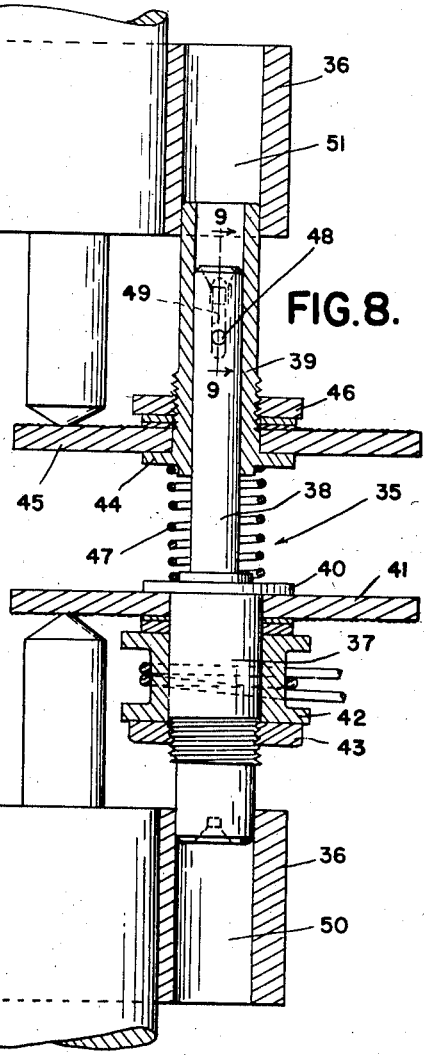
FIG.8.
FIG.9.
INVENTOR.
HENRY THOMAS PLATZ
BY
Whittemore Hulbert Belknap
ATTORNEYS Oct. 27, 1942.  H. T. PLATZ  2,300,173
APPARATUS FOR DRESSING WELDER ELECTRODES
Filed Dec. 2, 1940  2 Sheets-Sheet 2

INVENTOR.
HENRY THOMAS PLATZ
BY
ATTORNEYS

Patented Oct. 27, 1942

2,300,173

UNITED STATES PATENT OFFICE 2,300,173

APPARATUS FOR DRESSING WELDER ELECTRODES

Henry Thomas Platz, Detroit, Mich., assignor to Briggs Manufacturing Company, Detroit, Mich., a corporation of Michigan Application December 2, 1940, Serial No. 368,273

13 Claims. (Cl. 51—241)

This invention relates generally to an improved method and apparatus for dressing welder electrodes.

It is one of the principal objects of this invention to provide a relatively simple, inexpensive apparatus capable of being readily applied to the electrodes of a welder for dressing the work engaging surfaces of the electrodes while the latter are assembled with the welder.

More particularly, the apparatus forming the subject matter of this invention is applicable to welders of the type having cooperating electrodes relatively movable into and out of engagement with the work to be welded. The efficiency of the welds produced by welders of the above type depends to a great extent on the condition of the work engaging surfaces of the electrodes. For example, if the work engaging surfaces become corroded, the transmission of current through the work is curtailed with the result that the work will not be heated to the proper temperature for welding. Also, if the work engaging surfaces of the electrodes do not have a flat engagement with the work, the area of the the weld and, consequently, the strength of the latter is reduced.

With the above in mind, the present invention contemplates an apparatus for simultaneously dressing both electrodes in a manner to insure flat engagement of the work engaging surfaces of both electrodes with the work and, at the same time, to clean or remove any corrosion from the surfaces.

Another object of this invention is to provide a dressing tool having telescopically engaging parts normally urged to extended position by a spring and collapsible to permit readily inserting the tool between the adjacent ends of the electrodes without disassembling the latter from the welder.

Still another feature of this invention is to provide an electrode dressing tool of the type set forth in the preceeding paragraph wherein one part has a driving connection with the other so as to permit rotation of the tool relative to the electrodes and wherein the spring exerts sufficient pressure on the cooperating parts of the tool to dress the work engaging surfaces of the electrodes as the tool is rotated.

A further feature of this invention is to provide electrode dressing apparatus comprising a pair of tools of the type previously set forth capable of being alternately applied to the electrodes for selectively shaving the tapered surfaces of the electrodes to maintain the same at the proper angle for efficient cooling, and burnishing or grinding the flat work engaging surfaces of the electrodes.

The foregoing, as well as other objects, will be made more apparent as this description proceeds, especially when considered in connection with the accompanying drawings, wherein:

Figure 1 is a side elevational view of a tool constructed in accordance with this invention;

Figure 2 is a sectional view taken substantially on the line 2—2 of Figure 1 and showing the tool in operative relationship with a pair of cooperating electrodes;

Figure 3 is an end elevation of the tool shown in Figure 1;

Figure 4 is a cross sectional view taken on the line 4—4 of Figure 2;

Figure 8 is a sectional view of a slightly modified form of the tool and showing the latter in operative relationship to a pair of cooperating welding electrodes; and Figure 9 is a fragmentary sectional view taken substantially on the line 9—9 of Figure 8.

Figure 6:
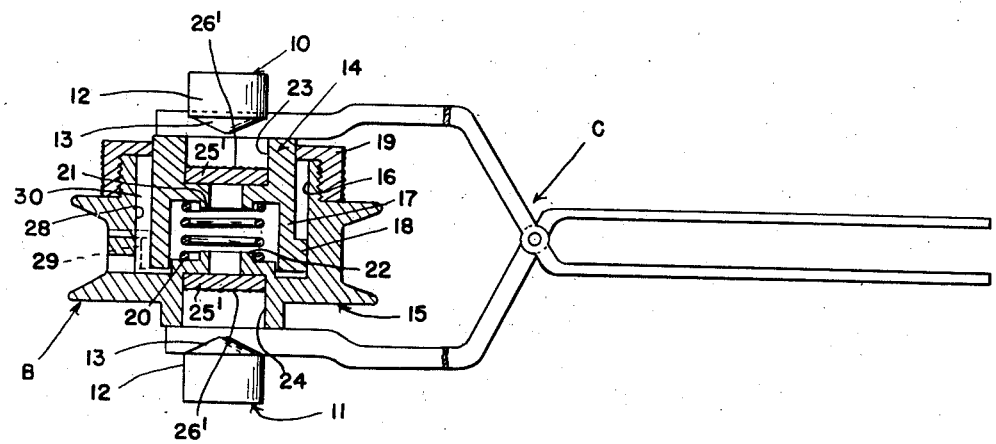
Figure 6 is a view similar to Figure 5 showing the manner in which the tool may be collapsed preparatory to assembling the same with the electrodes.
Figure 7:
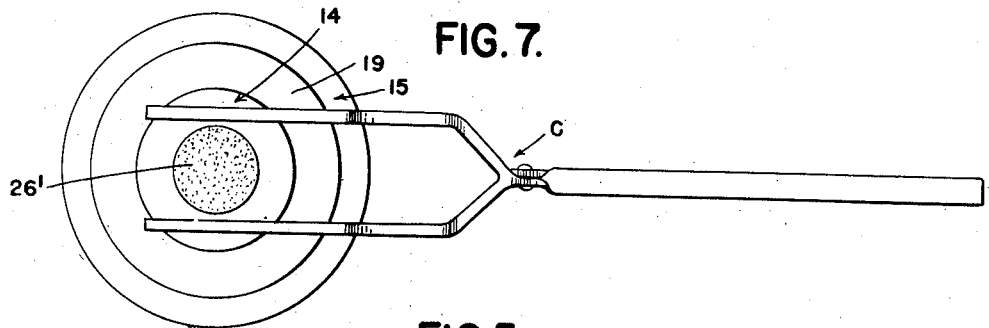
Figure 7 is a plan view of the construction shown in Figure 6.

For the purpose of illustrating the present invention, I have selected a resistance type of welder having a pair of axially aligned electrodes 10 and 11 supported for relative movement in directions toward and away from each other by mechanism not shown herein. The electrodes are shown in Figure 2 in their retracted positions, and it will be noted that each electrode comprises a cylindrical portion 12 terminating in a truncated conical end portion 13 having a flat work engaging surface. The cooperating electrodes are electrically connected in the welding circuit and the flat surfaces on the adjacent ends of the electrodes are adapted to engage the work to be welded when the electrodes are relatively moved toward each other so as to permit the passage of current through the work.

The resistance offered by the work to the passage of current therethrough heats the work and cooperates with the pressure exerted on the work by the electrodes to effect the weld. The efficiency of the weld depends to a great extent upon heating the work to the proper temperature and upon applying the required pressure on the work at the proper time. It has been found that the condition of the electrodes is highly critical in obtaining an effective weld, and according to the present invention, the electrodes may be periodically reconditioned in the minimum length of time without disassembling the electrodes from the welder.

The reconditioning apparatus comprises two tools A and B. The tool A (shown in Figures 1 to 4, inclusive) is for the purpose of shaving the truncated conical portions 13 of the electrodes to maintain the latter at a predetermined angle. The tool B, on the other hand, is employed to grind or burnish the flat work engaging surfaces of the electrodes to not only form the same perfectly flat but to, also, remove any corrosion that may have accumulated thereon. It should be understood at this time that it is not always essential to use the tool A since the work engaging surfaces may be satisfactorily dressed by the sole use of the tool B. However, I prefer to use the tool A periodically so as to maintain the angle of the truncated conical end portions 13 of the electrodes within certain limits, since I have discovered that this angle is critical in dissipating or transferring heat from the flat work engaging surfaces of the electrodes. Moreover, periodic use of the tool A serves to maintain the area of the work engaging surfaces uniform regardless of the amount of metal removed from the flat work engaging surfaces of the electrodes by the dressing tool B.

With the above in mind, reference will be made to the detail construction of the tools shown in Figures 1 to 7, inclusive. Upon reference to Figures 2, 5 and 6, it will be noted that each tool comprises a pair of telescopically engaging members 14 and 15. The member 15 is formed with an axially extending bore 16, and the member 14 is fashioned with an annular flange 17 terminating at the lower end in a radially outwardly extending enlargement 18 having a diameter predetermined to slidably engage the side walls of the bore 16. The two members are held in assembled relationship by means of a cap 19 threaded on the upper end of the bottom member 15 and centrally apertured to receive the top member 14. The diameter of the central opening through the cap 19 is less than the maximum diameter of the radial enlargement 18 on the member 14 and, as a result, the cap prevents disengagement of the member 14 from the member 15.

The two members are normally held in their extended positions by means of a coil spring 20 having the opposite ends respectively engaging the members 14 and 15. The upper end of the spring 20 extends into the annular flange 17 on the member 14 and is held from lateral displacement relative to the member 14 by means of an annular shoulder 21 formed on the member 14. The lower end of the spring 20 abuts the end wall of the bore 16 in the member 15 and is prevented from lateral shifting movement relative to the member 15 by a similar annular shoulder 22. Thus, it will be observed that the spring 20 functions to urge the two members to their extended positions wherein the radial enlargement 18 on the member 14 abuts the inner surface of the cap 19 surrounding the opening therethrough.

It will also be noted from Figure 2 that the upper end of the member 14 is counterbored to provide a recess 23 having an internal diameter approximating the external diameter of the cylindrical portion 12 on the electrode 10 and adapted to slidably receive the lower end of this portion. The cooperating member 15 is also counterbored to provide a similar recess 24 for slidably receiving the end of the cylindrical portion 12 on the electrode 11. As a result, the inner walls of the recesses 23 and 24 cooperate with the cylindrical portions 12 on the electrodes to support the cooperating members of the tools in operative relationship with the electrodes.

The tool A differs from the tool B in that cutting or shaving elements 25 are secured in the base portion of each of the recesses 23 and 24. The cutting elements are in the form of cylindrical inserts adapted to have a pressed fit with the inner walls of the recesses and, in the present instance, are each provided with cutters or scrapers 26. The cutters 26 are arranged as shown in Figure 3 and are set at an angle to the axis of the tool. The angle at which the cutters are set corresponds to the predetermined angle of taper of the truncated conical surfaces of the electrodes and serve to restore this taper upon rotation of the tool A relative to the electrodes. It will be noted from Figure 2 that the cutters are free from contact with the work engaging surfaces of the electrodes and have no effect on the latter. Attention is called to the fact, at this time, that the base portions of the recesses are formed with openings 27 of sufficient size to permit forcing the inserts out of the recesses by a suitable tool.

Figure 5:
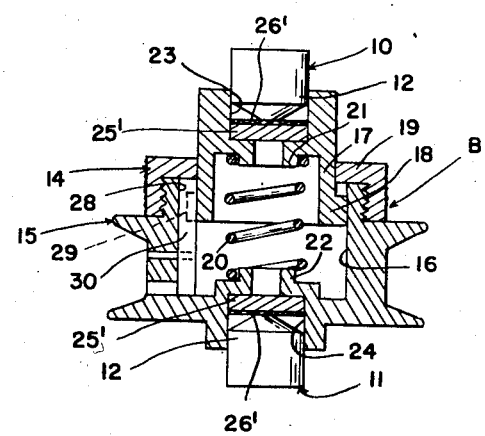
Figure 5 is a sectional view of the tool employed to grind or burnish the work engaging surfaces of the electrodes.

The tool B is shown in Figures 5 and 6 as having inserts 25' also pressed into the recesses 23 and 24 formed in the members 14 and 15 respectively. The inserts 25' are in the form of flat discs having an abrasive material 26' applied to the outer surfaces thereof. The arrangement is such that rotation of the tool B relative to the electrodes burnishes or otherwise dresses the work engaging surfaces of the electrodes to form the latter perfectly flat and to remove any corrosion that may have accumulated on these surfaces. Although the tool B removes very little metal from the work engaging surfaces of the electrodes, nevertheless, repeated use of the tool does have the effect of altering the angle of taper of the truncated conical portions 13 of the electrodes and increasing the area of the work engaging surfaces of the electrodes. When the condition becomes sufficiently critical, the tool A is employed in the manner set forth above to restore the angle of taper of the truncated conical end portions of the electrodes.

Provision is also made herein for rotating both tools relative to the electrodes. In the present instance, the member 15 of each tool is adapted to be rotated, and this member has a driving connection with the member 14 so that the latter is rotated as a unit with the member 15. Referring again to Figure 2, it will be noted that one side of the bore 16 in the member 15 is fashioned with a key slot 28 and the adjacent side of the radial enlargement 18 on the member 14 is formed with a registering key slot 29. A suitable key 30 is inserted in the key slots of the two members so as to not only insure rotation of the members as a unit but to, also, permit relative sliding movement of the members. The member 15 is also formed with an annular recess 31 in the outer surface thereof providing a pulley of sufficient size to receive a flexible linear member 32. In the present instance, I have shown the linear member as being in the form of a cord adapted to be reeved around the pulley in a manner to permit manually rotating the tool. With this arrangement, the tool may be oscillated by alternately exerting a pull on opposite ends of the cord. Of course, it would be a simple matter to rotate the tool by power means, but due to the fact that it is rarily necessary to remove very much material from the electrodes, I have found that it is more expedient and less complicated to manually operate the tool.

In use, both tools are manipulated in exactly the same manner to assemble them with or remove them from the electrodes and, accordingly, a description of the operation of one tool will suffice for both. In detail the tool is collapsed by relatively moving the members 14 and 15 toward each other against the action of the spring 20. The over-all length of the tool in the collapsed position thereof is less than the distance between the adjacent ends of the electrodes when the latter are in their retracted positions and, as a result, the tool may be inserted between the adjacent ends of the electrodes. The tool is maneuvered between the electrodes to align the recesses 23 and 24 with the adjacent ends of the electrodes and, when this condition exists, the pressure on the members is released. Releasing of the pressure on the members permits the latter to move toward their extended positions by the spring 20 and, in so doing, the recesses 23 and 24 receive the adjacent ends of the electrodes.

The distance between the electrodes in the retracted positions of the latter is less than the over-all length of the tool when extended, with the result that the inserts 25 or 25' (depending on which tool is in use) are yieldably pressed against the adjacent ends of the electrodes by the spring 20. After the tool is supported in the above manner, the operator wraps the linear member 32 around the pulley 31 and oscillates or rotates the tool by proper manipulation of the linear member. Inasmuch as the reconditioning inserts of the tool are urged into engagement with the adjacent ends of the electrodes by the spring 20, it follows that rotation of the tool relative to the electrodes causes the cutters 26 in one instance to shove the truncated conical surfaces of the electrodes, and the abrasive material 26' in the other instance to dress or burnish the work engaging surfaces on the electrodes.

After the work engaging surfaces of the electrodes are properly reconditioned, the cooperating parts 14 and 15 of the tool are again collapsed against the action of the spring 20 and the tool is removed from the position thereof between the electrodes. It may be pointed out at this time that while the spring 20 of each tool is sufficiently strong to furnish the pressure required to properly recondition the adjacent ends of the electrodes, nevertheless, the spring permits collapsing of the tool with comparatively little effort. In this connection, attention is directed to Figures 6 and 7 wherein I have shown a tool C for collapsing the tools A and B. The tool C is in the form of a pair of tongs having cooperating parts pivotally connected together intermediate the ends and having bifurcated portions at one end adapted to receive the electrodes between the furcations thereof in the manner shown in Figure 7. The furcations bear on the opposite ends of the members 14 and 15 of the tool in the manner shown in Figure 6, with the result that movement of the opposite ends of the cooperating parts of the tongs toward each other collapses the tool against the action of the spring 20.

In Figures 8 and 9 of the drawings, I have illustrated a tool 35 adapted to be rotatably mounted on the electrode supporting brackets 36 instead of directly on the electrodes. Upon reference to Figure 8, it will be noted that the tool 35 comprises a plunger 37 having a reduced portion 38 telescopically engaging within a sleeve 39. The plunger 37 is provided with a radially outwardly extending enlargement 40 against which a grinding disc 41 is clamped by means of a pulley 42 and a clamping nut 43 threadedly mounted on the plunger.

The sleeve 39 is provided with a radially outwardly extending enlargement 44 at the lower end against which a grinding disc 45 is clamped by a nut 46 threadedly mounted on the sleeve. The two discs are normally urged in directions away from each other by means of a coil spring 47 surrounding the plunger 37 with the opposite ends respectively engaging the radially extending enlargements 40 and 44.

As a result of the above construction, the spring 47 tends to move the sleeve 39 in an upward direction relative to the plunger 37 and the extent of this movement is determined by a pin 48 extending transversely through the upper end of the plunger 37 and having the opposite ends engaging in elongated slots 49 formed in the opposite side walls of the sleeve 39. The pin 48 also provides a driving connection between the plunger 37 and the sleeve 39 so that rotation of the pulley 42 on the plunger 37 effects a corresponding rotation of the sleeve 39.

The above construction is such that when the ends of the pin 48 are in engagement with the end walls of the slots 49 in the sleeve 39, the distance between the discs 41 and 45 is greater than the distance between the adjacent ends of the electrodes when the latter are in their retracted positions. It follows, therefore, that when it is desired to install the tool in operative relation to the electrodes, the tool is collapsed by relatively moving the discs toward each other against the action of the spring 47. When the tool is in its collapsed position, it is inserted between the brackets 36 and the pressure exerted on the tool to hold the same in its collapsed position is released. As a result, the lower end of the plunger 36 is permitted to extend into a bore 50 formed in the lowermost electrode supporting bracket 36 and the upper end of the sleeve 39 is permitted to extend into a bore 51 formed in the uppermost electrode supporting bracket 36. It will, of course, be understood that positioning of the tool in the above manner locates the discs 41 and 45 between the electrodes. As shown in Figure 8, the bottom surface of the lower disc 41 engages the work engaging surface on the lower electrode, and the upper surface of the disc 45 engages the work engaging surface on the top electrode.

The above construction is such that the discs are respectively held in frictional engagement with the work engaging surfaces of the electrodes by means of the spring 47, with the result that rotation of the tool imparts an abrasive action on the work engaging surfaces of the electrodes by the grinding discs. The discs are, of course, held in parallel planes normal to the axis of the electrodes by the engagement of the opposite ends of the tool in the bores 50 and 51 formed in the electrode supporting brackets. As a result, the discs will not only remove any corrosion that may have accumualted on the work engaging surfaces of the electrodes, but, will also form the surfaces substantially flat.

What I claim as my invention is:

1. A tool for reshaping the adjacent end portions of a pair of cooperating axially aligned electrodes, said tool comprising axially spaced revoluble members supported for relative movement toward and away from each other and insertable between the adjacent ends of the electrodes in the retracted positions of the members, work performing surfaces on the members respectively engageable with the adjacent ends of the electrodes, yieldable means between said members for urging the work performing surfaces into frictional engagement with the adjacent end portions of the electrodes, and means for rotating said members relative to the electrodes to reshape the adjacent end portions of the latter.

2. A tool for reshaping the adjacent end portions of a pair of cooperating axially aligned electrodes supported for relative movement toward and away from each other, said tool comprising a revoluble unit insertable between the electrodes in the retracted position thereof and having axially aligned recesses respectively rotatably receiving the adjacent ends of the electrodes to support the tool relative to the latter, and means in said recesses engageable with the adjacent end portions of the electrodes to reshape the latter end portions in response to rotative movement of the unit relative to said electrodes.

3. A tool for reshaping the work engaging surfaces of a pair of cooperating axially aligned electrodes, said tool comprising a pair of relatively slidably telescopically engaging revoluble members collapsible to permit insertion of the tool between the electrodes and respectively carrying reshaping means engageable with the work engaging surfaces of the electrodes, and yieldable means resisting collapsing of said members and normally urging the reshaping means into frictional engagement with the work engaging surfaces of the electrodes to reshape the latter surfaces in response to rotative movement of said members relative to the electrodes.

4. A tool for reshaping the adjacent end portions of a pair of cooperating axially aligned electrodes supported for relative movement toward and away from each other, said tool comprising a pair of relatively slidable telescopically engaging members collapsible to permit inserting the tool between the adjacent ends of the electrodes in the retracted positions of the latter and respectively carrying reshaping elements engageable with the adjacent end portions of the electrodes, a coil spring having the opposite ends respectively engaging the members to resist collapsing of the latter and normally urging the reshaping elements into frictional engagement with the adjacent end portions of the electrodes, a driving connection between said members, and means on one of the members for rotating said members relative to the electrodes.

5. A tool for reshaping the work engaging surfaces of a pair of cooperating axially aligned electrodes, said tool comprising a pair of relatively slidable telescopically engaging members collapsible to permit inserting the tool between the adjacent ends of the electrodes, a coil spring resisting collapsing of the members, said members having recesses respectively receiving the adjacent end portions of the electrodes upon return of the members to their extended positions and cooperating with the electrodes to rotatably support the tool in operative relation to said electrodes, and means supported in the recesses and engageable with the work engaging surfaces of the electrodes to reshape the latter surfaces upon rotation of the tool relative to the electrodes.

6. A tool for reshaping the adjacent end portions of a pair of cooperating axially aligned electrodes, said tool comprising a pair of relatively slidably telescopically engaging members collapsible to permit inserting the tool between the adjacent ends of the electrodes, a coil spring resisting collapsing of the members, said members having recesses respectively receiving the adjacent end portions of the electrodes upon return movement of the members to their extended positions and cooperating with the electrodes to rotatably support the tool in operative relation to said electrodes, removable inserts supported in the base portions of the recesses and respectively engageable with the adjacent end portions of the electrodes, and means for rotating the tool relative to the electrodes.

7. A tool for reshaping the adjacent end portions of a pair of cooperating axially aligned electrodes supported for relative movement toward and away from each other, said tool comprising a pair of relatively slidably telescopically engaging members having a driving connection with one another, the distance between the adjacent ends of the electrodes in the retracted positions of the latter being less than the overall length of the tool in the extended positions of the members requiring relative movement of the members toward each other to insert the same between the adjacent ends of the electrodes, said members having recesses respectively receiving the adjacent end portions of the electrodes to rotatably support the tool on the electrodes, means in the base portions of the recesses for engaging the adjacent end portions of the electrodes to reshape the latter upon rotation of the tool relative to the electrodes, a spring between said members normally urging the latter to their extended positions and maintaining the electrode reshaping means in frictional engagement with the adjacent end portions of the electrodes, and means for rotating the tool relative to the electrodes.

8. A tool for reconditioning work engaging surfaces of a pair of cooperating electrodes, said tool comprising a pair of axially spaced revoluble discs having work performing surfaces respectively engageable with the work engaging surfaces of the electrodes, yieldable means acting on the discs for urging the work performing surfaces into engagement with the work engaging surfaces of the electrodes, and means for rotating said discs relative to the electrodes.

9. A tool for reshaping the work engaging surfaces of a pair of cooperating electrodes supported for relative movement toward and away from each other, said tool comprising a pair of axially spaced revoluble discs movable toward each other to permit inserting the same between the electrodes and respectively engageable with the work engaging surfaces of the electrodes, yieldable means resisting relative movement of the discs toward each other and effective to urge the discs into frictional engagement with the adjacent work engaging surfaces of the electrodes, and means cooperating with the electrode supports for maintaining the discs in parallel planes perpendicular to the axis of the electrodes.

10. A tool for reshaping the work engaging surfaces of a pair of electrodes, a pair of electrodes having vertically spaced supporting means provided with axially aligned recesses, said tool having an over-all length greater than the distance between the supporting means and having telescopically engageable parts relatively movable toward each other to permit the tool to be inserted between the supporting means, a pair of discs respectively mounted on said parts and respectively engageable with the work engaging surfaces of the electrodes, a spring between said telescopically engaging parts yieldably urging the free ends of said parts into the recesses in the electrode supporting means and yieldably urging the discs into engagement with the work engaging surfaces of the electrodes.

11. A tool for reshaping a pair of electrodes supported for relative movement toward and away from each other and having adjacent end portions provided with truncated conical surfaces, said tool having electrode reshaping elements insertable between the adjacent ends of the electrodes in the retracted positions of the latter and respectively engageable with the truncated conical surfaces of the electrodes to reshape said surfaces in response to rotation of the elements relative to the electrodes, and means on the tool for rotating the elements relative to said electrodes.

12. A tool for reshaping a pair of electrodes having adjacent end portions provided with truncated conical surfaces, said tool comprising a pair of relatively slidable telescopically engaging parts collapsible to permit insertion of the tool between the electrodes and having means cooperating with the electrodes to rotatably support the tool on the electrodes, reshaping elements on said parts and respectively engageable with the truncated conical surfaces on the adjacent ends of the electrodes to reshape the latter in response to rotation of said tool parts relative to the electrodes, spring means resisting collapsing of the parts and normally urging the reshaping elements into engagement with the truncated conical surfaces on the electrodes, and means for rotating the parts of the tool relative to said electrodes.

13. A tool for reshaping the work engaging surfaces of a pair of cooperating axially aligned electrodes, said tool comprising a pair of axially spaced work reshaping members supported for relative movement toward and away from each other and insertable between the adjacent ends of the electrodes in the retracted positions thereof, work performing surfaces on said members extending in parallel planes perpendicular to the axes of the electrodes, yieldable means resisting relative movement of the members toward each other and operable to yieldabably urge the work performing surfaces on the members into frictional engagement with the adjacent ends of the electrodes, and means for rotating said members to reshape the adjacent ends of the electrodes.

HENRY THOMAS PLATZ.